(12) United States Patent
Rakshit et al.

(10) Patent No.: US 10,999,640 B2
(45) Date of Patent: May 4, 2021

(54) AUTOMATIC EMBEDDING OF INFORMATION ASSOCIATED WITH VIDEO CONTENT

(71) Applicant: International Business Machines Corporation, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/203,944

(22) Filed: Nov. 29, 2018

(65) Prior Publication Data

US 2020/0177960 A1    Jun. 4, 2020

(51) Int. Cl.
| | |
|---|---|
| *G06F 3/00* | (2006.01) |
| *G06F 13/00* | (2006.01) |
| *H04N 5/445* | (2011.01) |
| *H04N 21/4722* | (2011.01) |
| *H04N 21/858* | (2011.01) |
| *H04N 21/2187* | (2011.01) |
| *H04N 21/488* | (2011.01) |
| *H04N 21/8545* | (2011.01) |

(52) U.S. Cl.
CPC ..... *H04N 21/4722* (2013.01); *H04N 21/2187* (2013.01); *H04N 21/4882* (2013.01); *H04N 21/858* (2013.01); *H04N 21/8545* (2013.01)

(58) Field of Classification Search
CPC .......... H04N 21/4722; H04N 21/2187; H04N 21/4882; H04N 21/8545; H04N 21/858
See application file for complete search history.

(56) References Cited

U.S. PATENT DOCUMENTS

| | | | |
|---|---|---|---|
| 6,774,908 | B2 | 8/2004 | Bates et al. |
| 7,669,127 | B2 | 2/2010 | Hull et al. |
| 8,364,671 | B1 | 1/2013 | Sinton et al. |
| 9,355,312 | B2 | 5/2016 | Amtrup et al. |
| 9,779,323 | B2 | 10/2017 | Hansson et al. |
| 9,961,404 | B2 | 5/2018 | Mallinson |
| 2007/0180488 | A1 | 8/2007 | Walter et al. |
| 2009/0144772 | A1* | 6/2009 | Fink ...................... G06Q 30/02 725/42 |
| 2011/0096135 | A1 | 4/2011 | Hegde et al. |

(Continued)

*Primary Examiner* — Kyu Chae
(74) *Attorney, Agent, or Firm* — Marcus Walker

(57) ABSTRACT

Aspects of the present invention disclose a method, computer program product, and system for embedding information associated with content depicted in a video frame into a video file. The method includes one or more processors identifying an object depicted in a frame of a video file. The method further includes determining information associated with the identified object. The method further includes generating a graphical user interface (GUI) element that includes an embedded link to the determined information associated with the identified object. The method further includes embedding the generated GUI element into the video file overlaying a portion of the frame of the video file that corresponds to a location of the identified object within the frame of the video file.

20 Claims, 6 Drawing Sheets

(56) References Cited

U.S. PATENT DOCUMENTS

| | | | | |
|---|---|---|---|---|
| 2011/0138416 A1* | 6/2011 | Kang | .................... | G06F 3/0482 |
| | | | | 725/39 |
| 2013/0021206 A1* | 1/2013 | Hach | ........................ | G01S 5/06 |
| | | | | 342/451 |
| 2013/0144962 A1* | 6/2013 | Turner | ................... | G06F 15/16 |
| | | | | 709/206 |
| 2014/0025680 A1* | 1/2014 | Moganti | ................. | G06F 16/94 |
| | | | | 707/737 |
| 2015/0326925 A1* | 11/2015 | Ozkan | ................. | H04N 21/466 |
| | | | | 725/36 |
| 2016/0071319 A1* | 3/2016 | Fallon | ................... | G06T 19/006 |
| | | | | 345/633 |
| 2016/0275353 A1* | 9/2016 | Wnuk | ................ | G06K 9/00671 |
| 2017/0185276 A1* | 6/2017 | Lee | .................... | G06F 3/04883 |
| 2019/0030437 A1* | 1/2019 | Subbiah | ................ | A63F 13/327 |

* cited by examiner

AUTOMATIC EMBEDDING OF INFORMATION ASSOCIATED WITH VIDEO CONTENT

BACKGROUND OF THE INVENTION

The present invention relates generally to the field of streaming intelligence, and more particularly to embedding content in a video file.

In recent years, the growth of online collaborative services (e.g., web seminars, webcasts, peer-level web meetings, etc.) have produced opportunities for innovation in the features associated with the services. Video files of web seminars may contain embedded links to content that includes additional information about the speakers and/or content discussed during the seminar.

A link is a method to add a reference to external content (e.g., document, image, uniform resource locator, etc.), allowing access to the external content in response to a selection of the link. Although the external content can be stored independent of the content that includes the link, a user that does not have access to the external content directly may access the content via a link. Embedding is a method to incorporate external content into an existing file, where the result is external content is now accessible through the existing file.

Cognitive analytics combines the use of cognitive computing and analytics. Cognitive computing combines artificial intelligence and machine-learning algorithms, in an approach that attempts to reproduce the behavior of the human brain. Analytics is the scientific process of transforming data into insights for making better decisions. Cognitive analytics applies intelligent technologies to bring unstructured data sources within reach of analytics processes for decision making.

SUMMARY

Aspects of the present invention disclose a method, computer program product, and system for embedding information associated with content depicted in a video frame into a video file. The method includes one or more processors identifying an object depicted in a frame of a video file. The method further includes one or more processors determining information associated with the identified object. The method further includes one or more processors generating a graphical user interface (GUI) element that includes an embedded link to the determined information associated with the identified object. The method further includes one or more processors embedding the generated GUI element into the video file overlaying a portion of the frame of the video file that corresponds to a location of the identified object within the frame of the video file.

Additional aspects of the present invention disclose a method, computer program product, and system for embedding screen content of a video frame into a video file. The method includes one or more processors identifying a computing device in a frame of a video file. The method further includes one or more processors determining that the computing device is displaying content. The method further includes one or more processors identifying the content the computing device is displaying. The method further includes one or more processors requesting the identified content that the computing device is displaying. The method further includes one or more processors embedding a link to the identified content into the video file.

DETAILED DESCRIPTION

Embodiments of the present invention allow for automatic embedding of a link to content into a video file. A video file, which includes a frame containing content displayed on a screen of a computing device, is analyzed to detect and classify the content displayed on the screen in the frame. The classifications of the displayed content are utilized to request a corresponding file from the computing device. A link to the corresponding file is embedded in the frames of the video file that depict the corresponding content. The link to the corresponding file is displayed to a user in response to the user selecting the displayed content in a frame of the video file.

Some embodiments of the present invention recognize that existing solutions for embedding a video file with content is a manual process. For example, to share a file that is present in a frame of a video, a content creator must either manually embed a link to the content in the video description, or manually embed a link to the content in the video file. Various embodiments of the present invention improve the efficiency of the embedding process by utilizing cognitive visual recognition to identify and automatically embed content into a video. Therefore, content is accessible to a user without manual intervention of the content creator. Furthermore, various embodiments of the present invention improve the efficiency of the network by utilizing less resources to transmit the video file, which includes the content, to a device of a user over the network. For example, embedding the content in the video file reduces the amount of network resources expended to respond to requests and transmit the content and video file hosted on a server individually.

Implementation of embodiments of the invention may take a variety of forms, and exemplary implementation details are discussed subsequently with reference to the Figures.

Figure 1:
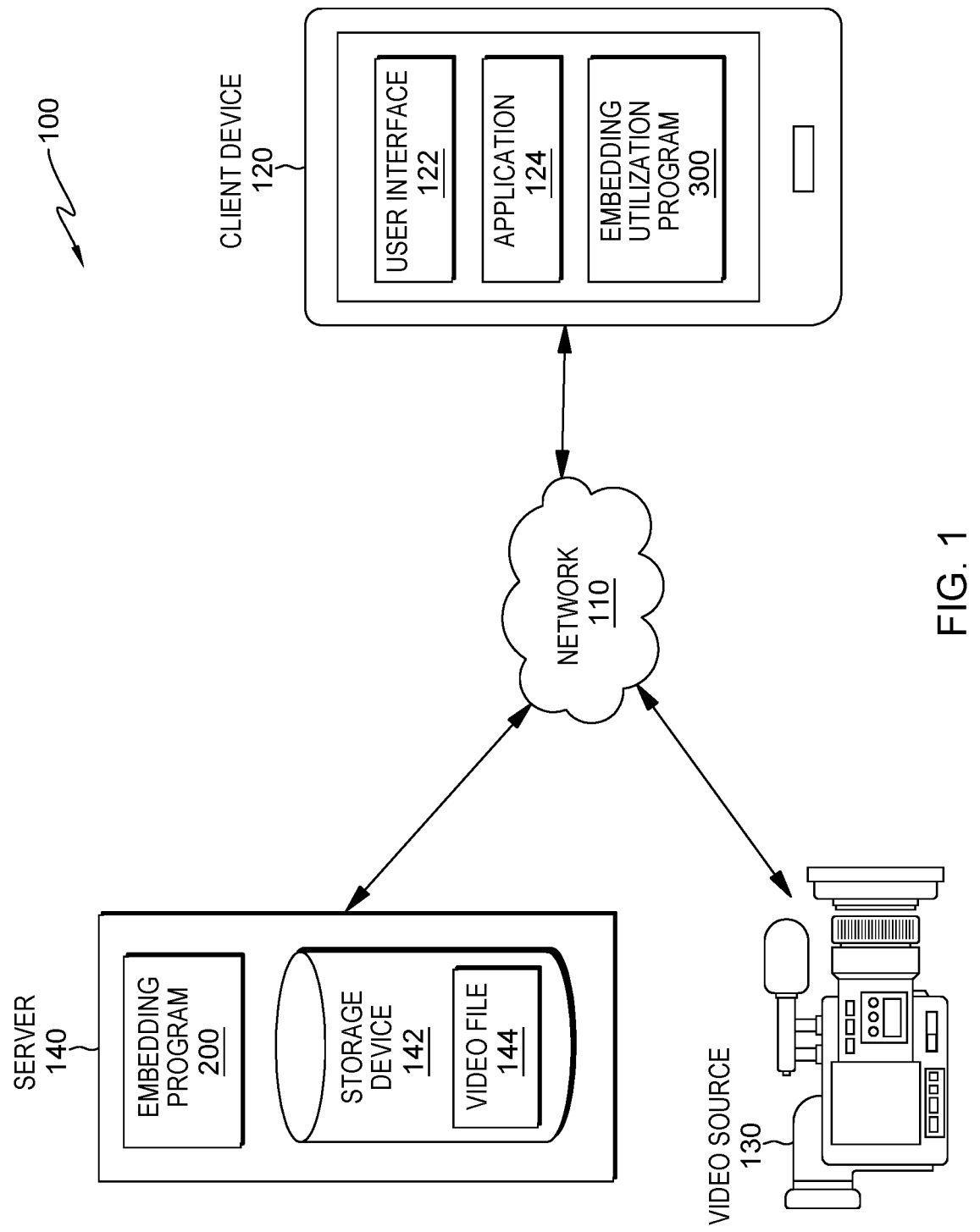
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120, video source 130, and server 140, all interconnected over network 110. In an example embodiment, video source 130 transmits data (e.g., video file 144) to server 140 that a user accesses using client device 120. In one embodiment, client device 120, video source 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols that will support communications between client device 120, video source 130, and server 140, in accordance with embodiments of the present invention.

In various embodiments of the present invention, client device 120 may be a workstation, personal computer, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 5, in accordance with embodiments of the present invention.

Client device 120 includes user interface 122, application 124, embedding utilization program 300. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content. For example, application 124 is a web browser of a tablet that a user can utilize to access videos on a website. In another embodiment, a user utilizes application 124 of client device 120 to access content stored on server 140. For example, a user utilizes a web browser (e.g., application 124) to view a video (e.g., video file 144) stored on a server.

Embedding utilization program 300 retrieves content corresponding to a user selection and displays the content to a user. In one embodiment, embedding utilization program 300 detects an interaction with video file 144 using user interface 122 of client device 120. For example, embedding utilization program 300 monitors a GUI of a computer (e.g., client device 120) to detect that a user interacts with a portion of a frame in a video (e.g., video file 144). In another embodiment, embedding utilization program 300 retrieves the content embedded in video file 144 that corresponds to a location of the interaction in a frame of video file 144. For example, embedding utilization program 300 uses pixel coordinates of where the content (e.g., a photograph, presentation, video, etc.) is located in each frame of a video (e.g., video file 144) to determine whether a user interaction with the video is within the range of pixel coordinates that correspond to the content. In another example, embedding utilization program 300 retrieves the content (e.g., a photograph, presentation file, video, etc.) from the container of a video file where a slide of the presentation file is present in a frame of the video. In yet another example, embedding utilization program 300 retrieves a link from the container of a video file (e.g., video file 144) where the link is a universal resource locator (URL) of a video (i.e., the embedded content) shown in a frame of the video file.

In various embodiments of the present invention, video source 130 can be a camera, mobile device, personal computer, or any other device capable of motion picture acquisition and executing computer readable program instructions, in accordance with embodiments of the present invention. In one embodiment, video source 130 records and stores images for archiving and processing. For example, a video camera captures images of a presentation and stores the images in memory to encode the images into a file container (e.g., video file 144). In another embodiment, video source 130 communicates with computing devices (e.g., computer monitors, mobile devices, etc.) in frame of the camera. For example, a video camera uses a wireless personal access network (WPAN) or ultrasound to send requests to computing devices and receives responses from the computing devices.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100 (e.g., client device 120). In general, server 140 is representative of any electronic device or combination of electronic devices capable of executing computer readable program instructions. Server 140 may include components as depicted and described in further detail with respect to FIG. 5, in accordance with embodiments of the present invention.

Server 140 includes storage device 142, video file 144, and embedding program 200. Storage device 142 can be implemented with any type of storage device, for example, persistent storage 505, which is capable of storing data that may be accessed and utilized by server 140 and client device 120, such as a database server, a hard disk drive, or a flash memory. In other embodiments, storage device 142 can represent multiple storage devices within server 130. Storage device 142 stores a plurality of files, such as video file 144. Video file 144 is a file format that is used for storing digital data that includes at least one embedded file. For example, video file 144 can be a video of a presentation that includes a link to a PDF file stored on a server. In additional embodiments, video file 144 can include or be associated with descriptive or human authored metadata. In one embodiment, video file 144 includes descriptive, structural, and administrative metadata. For example, video file 144 includes descriptive metadata that embedding program 200 utilizes to identify a title of video file 144. In another example, video file 144 includes human authored metadata that embedding program 200 uses to derive classifications based on keywords the human authored metadata includes.

In additional embodiments, data processing environment 100 can include additional servers (not shown) that host additional documents, images, and videos that are accessible to client device 120 via network 110. Embedding program 200 identifies content shown on a computing device in a video, requests the identified content (e.g., from the computing device in the video), and embeds the identified content in the frames of the video that depict identified content. For example, embedding program 200 identifies a PDF file on a tablet in a video of a presentation. In this example, embedding program 200 requests the corresponding PDF file from the tablet, and embeds the PDF file in the frames of the video of the presentation that depict the PDF.

Figure 2:
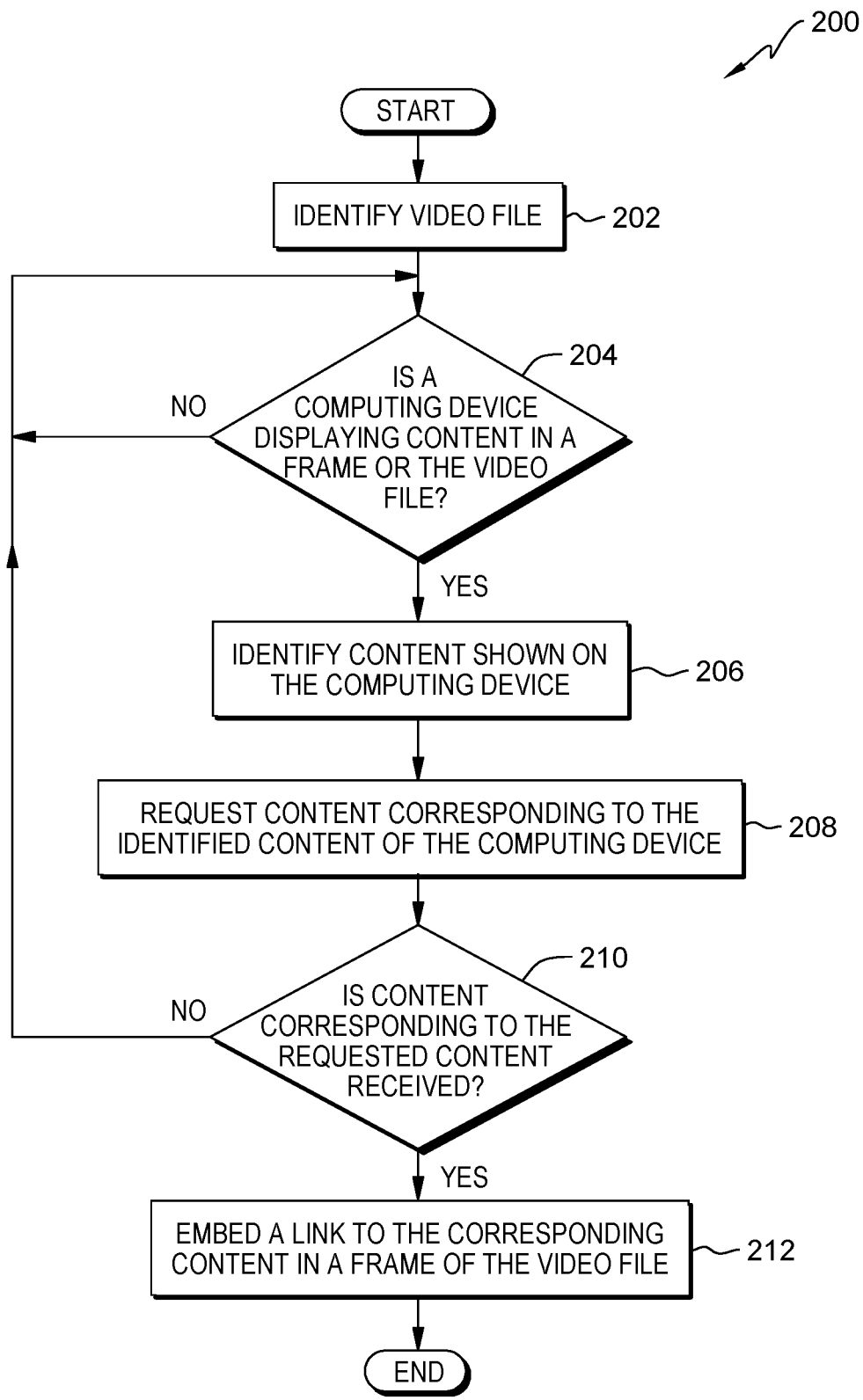
FIG. 2 is a flowchart depicting operational steps of a program for embedding a link to content identified in a video frame into a video file container of the video file, in accordance with embodiments of the present invention.

FIG. 2 is a flowchart depicting operational steps of embedding program 200, a program for embedding a link to content identified in a video into a video file container of the video, in accordance with embodiments of the present invention. In one embodiment, embedding program 200 initiates in response to embedding program 200 detecting that video source 130 is active and capturing images. For example, embedding program 200 monitors a video camera over a LAN (local access network) connection to detect when the video camera powers on and begins to record video footage.

In step 202, embedding program 200 identifies a video file. In accordance with various embodiments of the present invention, a video file refers to a file associated with live streaming video footage or recorded digital images. In one embodiment, embedding program 200 identifies video file 144 on storage device 142 using metadata corresponding to video source 130. For example, embedding program 200 utilizes metadata of a video file on a server to determine that the video file was created by a camera of a user. In another embodiment, embedding program 200 identifies video file 144 of video source 130 on server 140. For example, embedding program 200 recognizes that a video file corresponding to a live stream of a camera is hosted by a server.

Figure 4A:
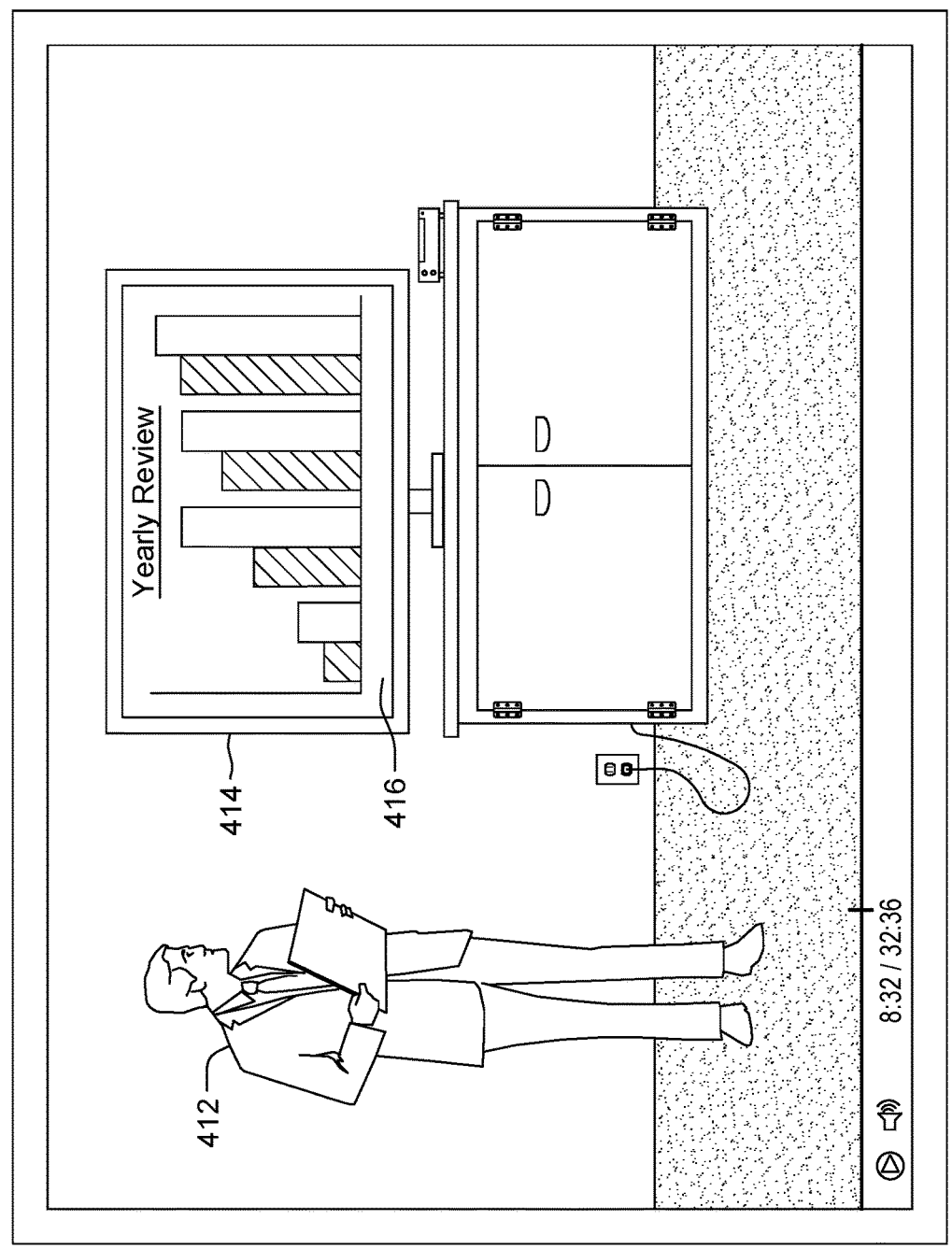
FIG. 4A depicts a sample video frame that includes a computing device and content that a program identifies, in accordance with embodiments of the present invention.

FIG. 4A depicts a sample video frame 400, which is an illustration of a frame of video file 144, that embedding program identifies. Video frame 400 includes presenter 412, computing device 414, and file 416. In an example embodiment, embedding program 200 identifies that video source 130 is creating the video file that includes video frame 400 (in step 202).

In decision step 204, embedding program 200 determines whether a computing device is displaying content in a frame of the video file. In one embodiment, embedding program 200 utilizes visual recognition to detect all objects (e.g., a person, articles of clothing a person is wearing, furniture, etc.) present in a video frame of video file 144. In another embodiment, embedding program 200 utilizes visual recognition to detect a computing device (e.g., televisions, projectors, mobile devices, etc.) present in a video frame of video file 144. For example, embedding program 200 analyzes a frame of the video to detect geometric components of a computing device (e.g., smart television) in the frame of the video. In this example, embedding program 200 analyzes the detected components of the computing device to determine an identity of an object representation stored in memory that is similar to the computing device in the frame of the video.

In another embodiment, embedding program 200 determines information associated with an identified object displayed in video file 144. For example, embedding program 200 determines a classification (e.g., smart television) of the identified object, and accesses a database of a server to determine capabilities associated with the classification. In another embodiment, information associated with an identified object includes purchase information corresponding to the identified object, documentation associated with the identified object, and/or descriptive information associated with the identified object. For example, purchase information corresponding to an identified object may include a link to a website to purchase the identified object, or a list of store locations where the identified object may be in stock. In another example, documentation associated with an identified object may include setup and installation documents, warranty information, or a link to a customer support site. In yet another example, descriptive information associated with an identified object may include a classification (e.g., smart television) or capabilities of the identified object based on a determined classification.

In another embodiment, embedding program 200 utilizes visual recognition to determine whether the detected computing device is displaying content. For example, embedding program 200 utilizes visual and cognitive analysis to define an area (i.e., pixel coordinates that correspond to the screen of the detected computing device) in a frame of the video that corresponds to a screen of the detected computing device. In this example, embedding program 200 utilizes visual recognition to detect whether the defined area (e.g., the screen of the computing device) contains objects that represent content. In various embodiments, the screen of the computing device is displaying content if embedding program 200 utilizes visual recognition to determine that objects within the defined area represent content. If embedding program 200 determines that a detected computing device is not displaying content, then embedding program 200 continues to monitor video file 144 for content to appear on a computing device. In one scenario, if embedding program 200 analyzes the defined area of the detected computing device (e.g., a screen of the computing device) in a frame the video and does not detect objects present in the defined area, then embedding program 200 determines that the detected computing device is not displaying content and continues to analyze frames of the video. In another scenario, if embedding program 200 analyzes the defined area of the detected computing device and detects objects that embedding program 200 cannot define, then embedding program 200 determines that the detected computing device is not displaying content and continues to analyze frames of video 144.

In an example embodiment with respect to FIG. 4A, embedding program 200 utilizes visual recognition and physical properties of an object (e.g., color, depth, and form of a television) included in video frame 400 to determine that the detected object (e.g., computing device 414) is a television. Embedding program 200 analyzes pixel coordinates (e.g., a defined area of computing device 414) of video frame 400 that corresponds to a screen of the television to identify text and objects within the defined area that represent content (e.g., a slide of file 416). In one scenario, embedding program 200 detects the text "Yearly review" and rectangular objects on the screen of the television (e.g. computing device 414), then embedding program 200 determines that computing device 414 is displaying content. In another scenario, if embedding program 200 detects no text or objects on the screen of the television (e.g. computing device 414), then embedding program 200 determines that the television is not displaying content and continues to analyze frames of video 144 (not shown).

In step 206, embedding program 200 identifies content shown on the computing device. In various embodiments of the present invention embedding program 200 assigns classifications, which are labels applied to content, to identify content. More specifically, in response to embedding program 200 determining that the detected computing device is displaying content, embedding program 200 identifies the content of the detected computing device. For example, in response to determining that the detected computing device is displaying content, embedding program 200 identifies the content appearing within the pixel coordinates that correspond to the defined area of the detected computing device in the frame of the video. In one embodiment, embedding program 200 identifies the content displayed on the detected computing device utilizing visual recognition and cognitive analysis to assign classifications (e.g., content type, class and type hierarchy, and presence of written content, etc.) to the content within the defined area of the detected computing device. For example, embedding program 200 determines that the content of the defined area of the detected computing device is a presentation (e.g., content type) that includes a graph that relates to sales (e.g., class and hierarchy type) that includes text (e.g., written content). In another embodiment, embedding program 200 assigns classifications to all objects detected in a frame of video file 144. For example, embedding program 200 assigns a label (e.g., television) to a detected computing device in the frame of the video.

In another embodiment, embedding program 200 determines a content type (e.g., presentation, image, video, etc.) of the content utilizing visual recognition and cognitive analysis to compare frames of video file 144. For example, embedding program 200 compares consecutive frames of the video that includes the content. In this example, embedding program 200 detects no variation in the objects and text of the defined area in the consecutive frames, and determines that the content is a presentation. In another example, embedding program 200 detects variations in the objects and text of the defined area in the consecutive frames, and determines that the content is a video. In yet another example, embedding program 200 detects no variation in the objects of the defined area in the consecutive frames, and determines that the content is an image.

In another embodiment, embedding program 200 determines a class and type hierarchy for the content of a frame of video file 144 that identifies what the content is related to. For example, embedding program 200 analyzes objects appearing in the defined area of the detected computing device in the frame of the video, detects that the defined area of the detected computing device includes a graph and a sales related title in the header of the defined area, and determines that the presentation relates to sales. In yet another embodiment, embedding program 200 determines that the defined area of the detected computing device includes written content. For example, embedding program 200 utilizes optical character recognition (e.g., NLP), detects images that represent printed text within the defined area of the detected computing device. Additionally, embedding program 200 determines that the defined area of the detected computing device contains text and assigns a written content classification to the frame of the video.

In an example embodiment with respect to FIG. 4A, embedding program 200 utilizes NLP, visual recognition, cognitive analysis to assign classifications, which identify a file 416 included in video frame 400. Embedding program 200 compares objects and text of the screen of the television included in video frame 400 to subsequent frames of the video (not shown), and detects no variations in the objects and text of the content (e.g., file 416) throughout a segment of the video. Embedding program 200 determines that the content type is a presentation and adds a presentation classification to file 416. Embedding program 200 analyzes the text and objects of the slide of file 416 appearing on the screen of a television in a frame of video frame 400, detects graphs that represent sales and profits of a company. Embedding program 200 determines that the class and hierarchy type of the slide of file 416 is a graph (e.g., class) that relates to sales (e.g., hierarchy type) and adds the class and hierarchy type classification to file 416. Embedding program 200 detects an image that represents the text "Yearly Review" in the slide of file 416 appearing on the screen of a television in a frame of video frame 400 using optical character recognition, determines the content contains written content, and assigns a written content classification. In another example embodiment, embedding program 200 uses the classifications assigned to file 416 to request matching content from local devices (not shown) capable of WPAN or ultrasound communication with video source 130. For example, embedding program 200 creates a broadcast message for file 416 that matches the classifications presentation (e.g., content type), graphs that relate sales (e.g., class and hierarchy), and titled "Yearly Review" (e.g., written content).

In step 208, embedding program 200 request content corresponding to the identified content of the computing device. In one embodiment, embedding program 200 generates a broadcast message, which includes a request for information that corresponds to a classification of the identified object (step 206). For example, embedding program 200 generates a broadcast message that includes a request purchase information for the identified object (e.g., a television) with a classification of "smart television". In another embodiment, embedding program 200 creates a broadcast message, which requests content corresponding to the classification of the identified computing device, and communicates the broadcast message to video source 130 that transmits the broadcast message through network 110 to a local device (e.g., a television) in frame of video file 144. For example, a broadcast message may include a request for content (e.g., purchase information, installation documentation, etc.). In another example, a broadcast message could also include an interaction request (e.g., ability to adjust settings of the identified computing device) with the identified computing device. In another embodiment, embedding program 200 creates a broadcast message, which requests content corresponding to the identified content, and communicates the broadcast message to video source 130 that transmits the broadcast message to a local device (e.g., a mobile device, smart television, projector, etc.). For example, embedding program 200 transmits a broadcast message to a video camera (e.g., video source 130) that broadcasts the message, which includes a request for the identified content, to a smart television within range of the video camera to respond with content that corresponds to the message. In another embodiment, the broadcast message is transmitted to the local device over a medium-field communication technology. For example, the video camera utilizes a wireless personal access network (WPAN) to transmit the broadcast message, which includes the determined classifications, to the smart television with a WPAN receiver that is displaying a slide of the presentation. In another example, the video camera utilizes ultrasound to transmit the broadcast message, which includes the determined classifications, to the smart television that is displaying a slide of the presentation. In yet another embodiment, video source 130 transmits a broadcast message that includes determined classifications to a local device. For example, a video camera transmits a broadcast message requesting content corresponding to classifications, which includes content type (e.g., presentation), and written content the text "sales" (e.g., the text "sales" as the title of the slide appearing in the captured frame). In another example, a video camera transmits a broadcast message requesting content corresponding to classifications, which includes (e.g., photograph), and class and hierarchy (e.g., a graph that relates to sales).

In decision step 210, embedding program 200 determines whether content corresponding to the requested content is received. In one embodiment, embedding program 200 determines whether video source 130 receives the content corresponding to the message sent to the local device. In various embodiments of the present invention the local device can analyze the request and send corresponding content or a user of the local device can manually respond to the request. For example, embedding program 200 sends a request for content and a smart television utilizes the classifications included in the message to find a presentation (e.g., content type) with the title "sales" (e.g., written content). In another example, an owner of a tablet receives a notification of the request for a photograph (e.g., content type) that relates to a bluebird (e.g., class and hierarchy) and locates a photograph matching the classifications in the tablet.

If embedding program 200 determines that none of the files correspond to the identified content of the broadcast message (decision step 210, no branch), then embedding program 200 returns to step 204 to determine whether a computing device is displaying content in a frame of video file 144. For example, if embedding program 200 determines that the user did not find a presentation file that corresponds to the requested content on the smart television, then embedding program 200 returns to step 204 to determine whether the smart television in a frame of the video is displaying content. In another embodiment, embedding program 200 monitors video source 130 to detect whether video source 130 received content corresponding to the request for identified content. For example, embedding program 200 monitors communications of a video camera to detect whether a request for a presentation titled "sales" is complete.

Figure 4B:
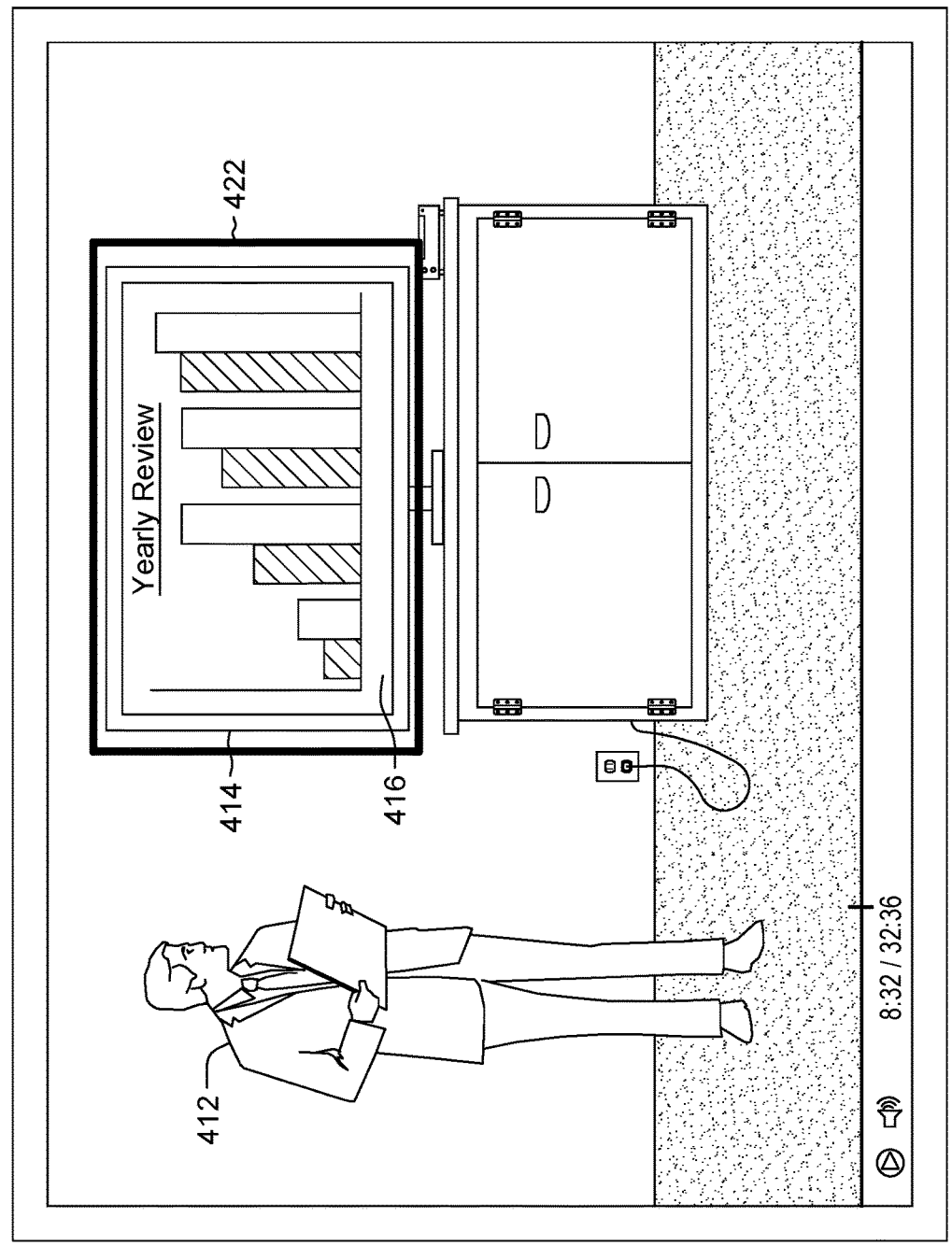
FIG. 4B depicts a sample video frame that includes an interactive overlay a program utilizes to retrieve content, in accordance with embodiments of the present invention.

FIG. 4B depicts a sample utilization video frame 420, which is an illustration of an overlay of video file 144, that embedding utilization program 300 utilizes to display content that embedding program 200 embeds into video file 144. Utilization video frame 420 includes overlay 422. Overlay 422 depicts a bounded area, which corresponds to pixel coordinates that include the breadths of computing device 414. Overlay 422 allows a user to interact with an object included in video file 144 to receive content that the object may represent. In this example, overlay 422 encompasses a defined area that corresponds to file 416.

In step 212, embedding program 200 embeds a link to the corresponding content in a frame of the video file. More specifically, in response to embedding program 200 determining that content corresponding to the requested content is received, then embedding program 200 embeds a link to the content or the actual content into a frame of video file 144. In one embodiment, embedding program 200 embeds a link to the received content into a frame of video file 144. For example, embedding program 200 embeds a link to the received sales presentation into a layer of the video.

In another embodiment, embedding program 200 embeds the received content into a frame of video file 144. For example, embedding program 200 embeds the received sales presentation into a layer of the video. In yet another embodiment, embedding program 200 embeds the link to the received content in every frame of video file 144 that the received content is visible. For example, embedding program 200 embeds the link to the received sales presentation into a layer of the video that corresponds to every frame of the video that embedding program 200 determines that the received sales presentation is visible in. In another example embedding program 200 utilizes the pixel coordinates of the smart television in each frame of the video that the smart television is visible and embeds an overlay that can include a hypervideo or hyperlink that corresponds to the pixel coordinates of the smart television.

In another embodiment, embedding program 200 generates a GUI, embeds the GUI with a link with determined information associated with the identified object in video file 144. Additionally, embedding program 200 embeds the GUI in a portion of a layer of video file 144 that corresponds to the identified object. For example, embedding program 200 creates a GUI, which includes purchase information of the smart television, and embeds the GUI into a portion of a video that corresponds to an area where the smart television appears in the video. In another example, the video (e.g., video file 144) is a live stream of a sports watch party, and the GUI is an augmented reality (AR) overlay, which allows a user to interact with identified objects of the live stream. In yet another embodiment, embedding program 200 embeds a link to the content into a GUI element overlaying a defined area of a frame of video file 144. For example, embedding program 200 augments a video with a link, which includes "How-to and/or purchase information" of the identified content, in defined interactive areas of the video that correspond to detected objects. In another example, embedding program 200 embeds a link to a website to purchase a smart television. In yet another example, embedding program 200 embeds a link to an installation guide for a smart television. In an example embodiment with respect to FIG. 4A, embedding program 200 embeds a link to file 416 into a layer of video file 144, and the layer of video file 144 corresponds to video frame 400 where file 416 is visible.

Figure 3:
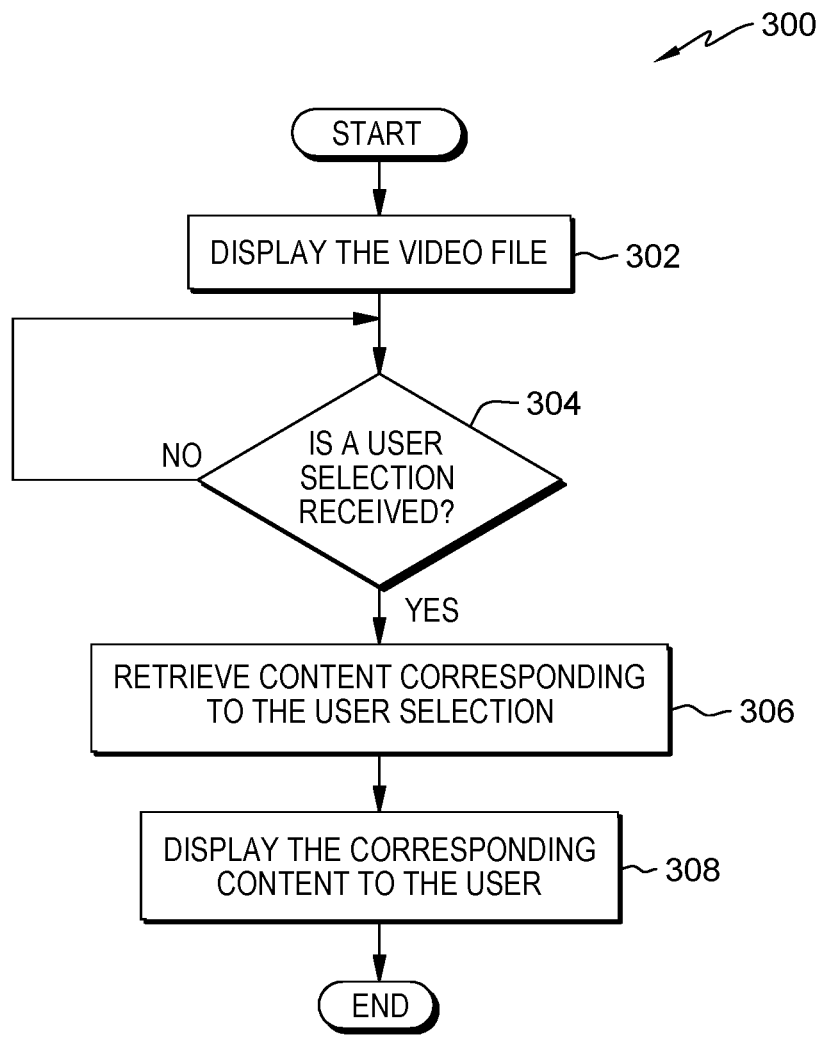
FIG. 3 is a flowchart depicting operational steps of a program retrieving and displaying content in response to a user selection, in accordance with embodiments of the present invention.

FIG. 3 is a flowchart depicting operational steps of embedding utilization program 300, retrieving and displaying content in response to a user selection, in accordance with embodiments of the present invention. In an example embodiment, embedding utilization program 300 initiates in response to a user accessing video file 144 using client device 120.

In step 302, embedding utilization program 300 displays the video file. In one embodiment, embedding utilization program 300 initiates as a user executes video file 144 on client device 120. In another embodiment, embedding utilization program 300 uses application 124 to display video file 144 on client device 120. For example, embedding utilization program 300 displays the embedded video in a web browser (e.g., application 124) of a mobile device (e.g., client device 120) of a user.

In decision step 304, embedding utilization program 300 determines whether a user selection is received. In one embodiment, embedding utilization program 300 monitors client device 120 to determine whether the user interacts with a bounded area in a frame of video file 144. In another embodiment, the bounded area is derived from the pixel coordinates of the detected computing device and the bounded area capable of interactivity. In various embodiments, a user selection is received if embedding utilization program 300 determines that the user interacted with a bounded area that corresponds to the detected computing device of a frame of video file 144 using user interface 122, such as the user touching the screen of a mobile device within the limits of the pixel coordinates of the bounded area.

If embedding utilization program 300 determines that a user selection is not received (decision step 304, no branch), then embedding utilization program 300 continues to monitor user interface 122 of client device 120 for a user selection. For example, if embedding utilization program 300 determines that a user interaction is not within pixel coordinates that define a bounded area that corresponds to the detected computing device, then embedding utilization program 300 continuously monitors a user interface of a mobile device for a user interaction within the bounded area. In an example embodiment with respect to FIG. 4B, embedding utilization program 300 if embedding utilization program 300 detects that a user interaction with the video is not within overlay 422, then embedding utilization program 300 determines that a user interaction is not received and continues to monitor the video for a user selection.

In step 306, embedding utilization program 300 retrieves content corresponding to the user selection. More specifically, in response to embedding utilization program 300 determining that a user interaction is within pixel coordinates that define a bounded area that corresponds to the detected computing device, embedding utilization program 300 retrieves the content corresponding to the detected computing device within the bounded area. For example, embedding utilization program 300 determines that a user interacted with a portion of a frame of the video that includes the GUI, which corresponds to the smart television in the video, and the GUI retrieves descriptive information associated with the identified object (e.g., determined information). In one embodiment, embedding utilization program 300 retrieves the embedded content, which corresponds to the user selection, from video file 144. For example, embedding utilization program 300 uses structural metadata to locate the corresponding content (e.g., link, presentation, PDF, image, video, etc.) and then extracts the embedded content from the container of the video. In an example embodiment with respect to FIG. 4B, in response to a user selection of file 416 encompassed in overlay 422, embedding utilization program 300 uses structural metadata to locate and extract file 416 from the container of video file 144.

In step 308, embedding utilization program 300 displays the corresponding content to the user. In one embodiment, embedding utilization program 300 utilizes the generated GUI to display information associated with the identified object to the user of client device 120. For example, in response to a user selecting the AR overlay corresponding to a television embedding utilization program 300 displays interactive components that allow the user to adjust settings of the television in the live stream from a mobile device of the user. In another embodiment, embedding utilization program 300 displays the content corresponding to the user selection to the user. For example, embedding utilization program 300 displays the extracted content (e.g., link, presentation, PDF, image, video, etc.) that corresponds to the user selection in a dialogue window while the user continues to view the video. In another example, embedding utilization program 300 displays the extracted content that corresponds to the user selection in a web browser of the mobile device (e.g., application 124).

In another embodiment, embedding utilization program 300 displays a window that allows a user to select interactive options that correspond to functions an object (e.g., any interactive electronic device) of video file 144 can perform. For example, embedding utilization program 300 may display a window with options (e.g., power settings, picture settings) that allow a user to interact with a smart television present in a frame of the video. In another example, embedding utilization program 300 displays a web browser that allows a user to switch lights in a room of the video to an on or off state through broadcast messages over medium-field communication technologies.

Figure 5:
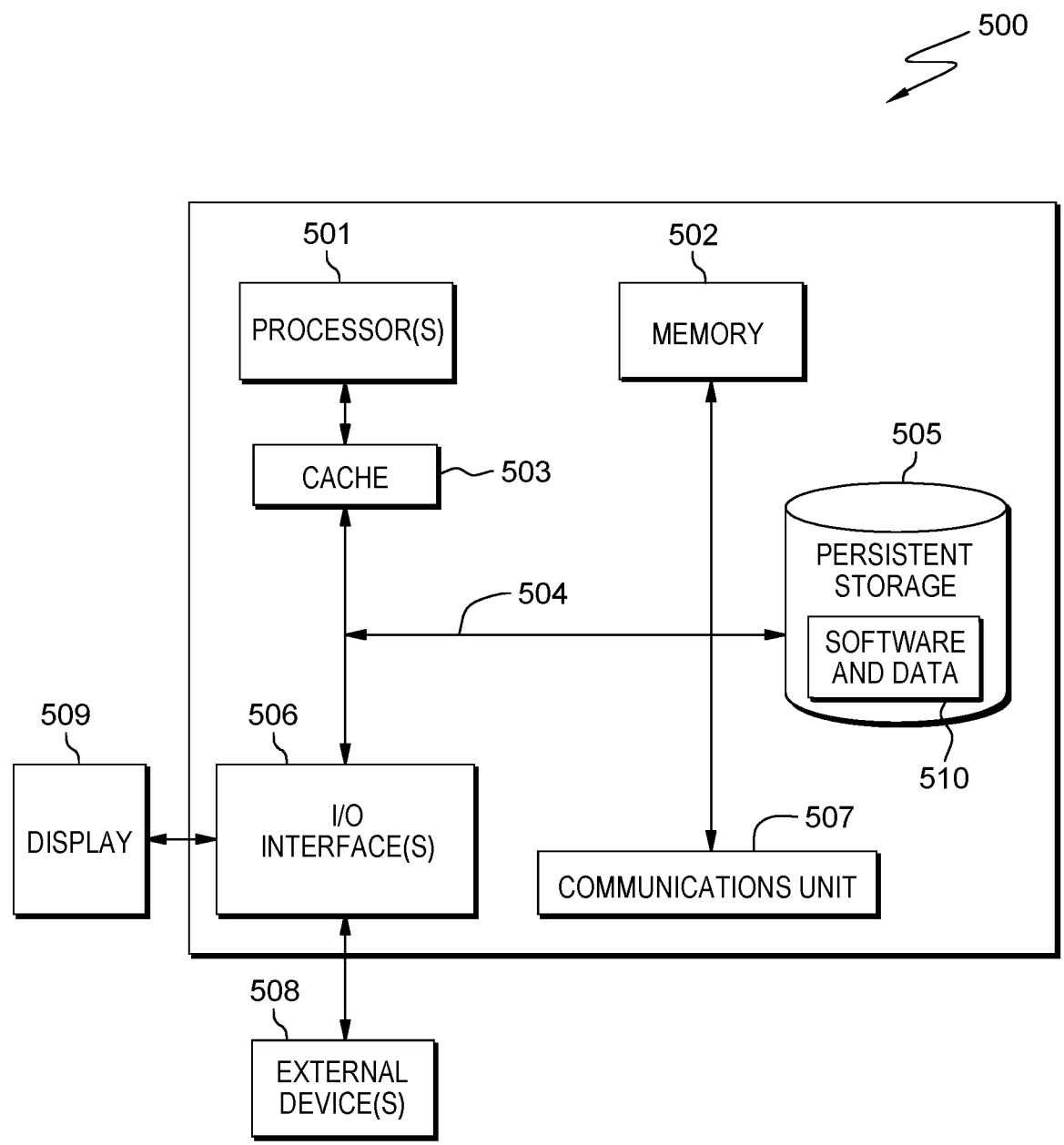
FIG. 5 depicts a block diagram of components of a computing system representative of the client device, video source, and server of FIG. 1, in accordance with embodiments of the present invention.

FIG. 5 depicts computer system 500, which is representative of client device 120, video source 130, and server 140, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made. Computer system 500 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data 510) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 510 can be stored in persistent storage 505 for access and/or execution by one or more of the respective processor(s) 501 via cache 503. With respect to client device 120, software and data 410 includes embedding utilization program 300. With respect to server 140, software and data 410 includes embedding program 200.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., software and data 510) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., software and data 510) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor. Display 509 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more processors, a computing device in a frame of a video file;
    determining, by one or more processors, that the computing device is displaying content;
    identifying, by one or more processors, the content the computing device is displaying;
    requesting, by one or more processors, the identified content that the computing device is displaying, wherein requesting the identified content further comprises:
        transmitting, by one or more processors, a communication to the computing device in the frame of the video file requesting a file that includes the identified content the computing device is displaying; and
    in response to receiving the file that includes the identified content, embedding, by one or more processors, the file that includes the identified content into the video file.

2. The method of claim 1, wherein identifying the content the computing device is displaying, further comprises:
    determining, by one or more processors, a classification of the content the computing device is displaying, wherein the determined classification includes information associated with categories that characterize the identified content.

3. The method of claim 2, wherein requesting the identified content that the computing device is displaying, further comprises:
    broadcasting, by one or more processors, a message to the identified computing device, wherein the message includes the determined classification of the content the computing device is displaying.

4. The method of claim 1, wherein embedding the link to the identified content into the video file, further comprises:
    embedding, by one or more processors, the link to the identified content into a graphical user interface (GUI) element overlaying a portion of the frame of the video file that corresponds to a location of the identified computing device within the frame of the video file.

5. The method of claim 4, wherein the embedded link directs a user to the identified content in response to receiving a selection of the GUI element from the user.

6. The method of claim 1, further comprising:
    verifying, by one or more processors, that the received link corresponds to content that matches the requested content.

7. The method of claim 1, wherein identifying a computing device in a frame of a video file, further comprises:
    detecting, by one or more processors, one or more geometric components of the computing device in the frame of the video file; and
    comparing, by one or more processors, the geometric components to stored object representations that correspond to known computing device types.

8. A method comprising:
    identifying, by one or more processors, an object depicted in a frame of a video file;
    determining, by one or more processors, information associated with the identified object;
    generating, by one or more processors, a graphical user interface (GUI) element that includes an embedded link to the determined information associated with the identified object;
    embedding, by one or more processors, the generated GUI element into the video file overlaying a portion of the frame of the video file that corresponds to a location of the identified object within the frame of the video file, wherein the generated GUI element provides one or more interactive components that correspond to one or more functions of the identified object depicted in the frame of the video file; and
    in response to detecting a user selecting an interactive component of the generated GUI element, transmitting, by one or more processors, a broadcast message to the identified object to perform a function that corresponds to the selected interactive component, wherein the broadcast message is transmitted by sound-based communication, wherein the function further comprises:
    retrieving, by one or more processors, a file that corresponds to the identified object from a container of the video file based at least in part on the user selecting the interactive component of the generated GUI.

9. The method of claim 8, wherein determining information associated with the identified object further comprises:
- determining, by one or more processors, a classification of the identified object; and
- determining, by one or more processors, capabilities associated with the identified object based on the determined classification.

10. The method of claim 8, wherein the embedded link of the GUI element directs a user to the determined information in response to receiving a selection of the GUI element from the user.

11. The method of claim 8, wherein the determined information associated with the identified object is selected from the group consisting of: purchase information corresponding to the identified object, documentation associated with the identified object, and descriptive information associated with the identified object.

12. The method of claim 8:
- wherein the video file is a live video stream; and
- wherein the GUI element is an augmented reality (AR) overlay.

13. The method of claim 12:
- wherein the determined information associated with the identified object includes interactive capabilities of the identified object, and
- wherein the embedded link of the GUI element prompts a user to with the interactive capabilities of the identified object in response to receiving a selection of the GUI element from the user.

14. The method of claim 8, wherein determining information associated with the identified object further comprises:
- determining, by one or more processors, a classification of the identified object; and
- generating, by one or more processors, a broadcast message that includes a request for information corresponding to the determined classification of the identified object.

15. A computer system comprising:
- one or more computer processors;
- one or more computer readable storage media; and
- program instructions stored on the computer readable storage media for execution by at least one of the one or more processors, the program instructions comprising:
- program instructions to identify a computing device in a frame of a video file;
- program instructions to determine that the computing device is displaying content;
- program instructions to identify the content the computing device is displaying;
- program instructions to request the identified content that the computing device is displaying, wherein the request further comprises:
  - program instructions to transmit a communication to the computing device in the frame of the video file requesting a file that includes the identified content the computing device is displaying; and
- program instructions to embed, in response to receiving the that includes the identified content, the file that includes the identified content into the video file.

16. The computer system of claim 15, wherein the program instructions to identify the content the computing device is displaying, further comprises program instructions to:
- determine a classification of the content the computing device is displaying, wherein the determined classification includes information associated with categories that characterize the identified content.

17. The computer system of claim 16, wherein the program instructions to request the identified content that the computing device is displaying, further comprises program instructions to:
- broadcast a message to the identified computing device, wherein the message includes the determined classification of the content the computing device is displaying.

18. The computer system of claim 15, wherein the program instructions to embed the link to the identified content into the video file, further comprises program instructions to:
- embed the link to the identified content into a graphical user interface (GUI) element overlaying a portion of the frame of the video file that corresponds to a location of the identified computing device within the frame of the video file.

19. The computer system of claim 18, wherein the embedded link directs a user to the identified content in response to receiving a selection of the GUI element from the user.

20. The computer system of claim 15, further comprising program instructions, stored on the one or more computer readable storage media, to:
- verify that the received link corresponds to content that matches the requested content.

\* \* \* \* \*